United States Patent [19]  [11] 3,915,729
Eustice  [45] Oct. 28, 1975

[54] HIGH TEMPERATURE SOLDER PASTES
[75] Inventor: Albert Lawrence Eustice, Lewiston, N.Y.
[73] Assignee: E. I. Du Pont de Nemours & Company, Wilmington, Del.
[22] Filed: Apr. 9, 1974
[21] Appl. No.: 459,325

[52] U.S. Cl. .................... 106/268; 148/23; 148/24; 148/25
[51] Int. Cl.² .................... B23K 35/36; C08L 91/00
[58] Field of Search ............ 106/268, 1; 148/23, 25, 148/24; 252/512–514

[56] References Cited
UNITED STATES PATENTS
804,664  11/1905  Leisel.................................... 148/24
1,208,799  12/1916  Kriews................................. 148/25

OTHER PUBLICATIONS
Chem. Abst. 45:8310e, 1951.

Primary Examiner—Theodore Morris

[57] ABSTRACT

Solder pastes capable of reflow after exposure to even high temperatures, comprising metal solder particles dispersed in a vehicle of dimers, trimers, and/or tetramers of unsaturated fatty acids having 14–20 carbon atoms. A wax may be present in the vehicle. The pastes are useful for soldering electronic components.

13 Claims, No Drawings

HIGH TEMPERATURE SOLDER PASTES

BACKGROUND OF THE INVENTION

Generally, the soldering of metals is effected by applying a soldering medium or flux on the place to be soldered, and then applying the solder with a soldering iron or the like. Alternatively, solder preforms have been used wherein a preform is heated to a molten state whereby it forms a good solder bond. Various preforms must be made for each individual situation. Consequently, the entire soldering process is very time consuming and expensive.

Various attempts have been made to produce printable (e.g., by screen or stencil techniques) solder compositions. More specifically, compositions suitable for use with electronic circuitry are of great utility. In the latter case, the vehicles used must (1) provide good printability, (2) be active and remove surface oxides at the melting point of the solder metals, and (3) leave a non-corrosive and non-conductive residue. These advantages have been fully obtained in the screen printable solder compositions of Conwicke U.S. Pat. No. 3,684,533, issued Aug. 15, 1972.

There is, however, a need for printable solder compositions which retain their pattern definition even upon being heated to elevated temperatures (e.g., 350°C.), yet are fluid enough to erase screen marks. Such compositions should retain their fluxing action after exposure to elevated temperature while being heated to the reflow temperature, or while being held for extended periods (e.g., a minute) at the reflow temperature. The vehicle in the solder pastes of U.S. Pat. No. 3,684,533 tends to vaporization and/or oxidation before elevated reflow temperatures are reached; hence, fluxing is minimal under such harsh conditions. Where a successful joint has been made with the solder paste of U.S. Pat. No. 3,684,533, it may be lost by being held at high temperature.

SUMMARY OF THE INVENTION

This invention is a printable solder paste composition of finely divided metal solder particles dispersed in a liquid vehicle, wherein the vehicle is or comprises dimers, trimers, and/or tetramers of unsaturated fatty acids. These unsaturated fatty acids have 14–20 carbon atoms, preferably 18 carbon atoms. The vehicle may additionally comprise up to 50% of a wax, more preferably 10–30% wax, by weight. The wax is preferably an aliphatic alcohol having 14–18 carbon atoms, more preferably a straight-chain aliphatic alcohol having 14–18 carbon atoms. Preferred waxes also include paraffins melting above 50°C.

The solder paste may additionally comprise a dispersant.

In the vehicle the unsaturated fatty acids preferably comprise a mixture of dimers and trimers of said fatty acid.

DETAILED DESCRIPTION OF THE INVENTION

The novel component used in the solder compositions is the polymer of unsaturated fatty acids (sometimes referred to herein as acid polymer). The acid polymer is a liquid at room temperature, to give a screen-printable solder composition. The acid polymer may be dimers, trimers or tetramers, preferably dimers and trimers, of one or more unsaturated fatty acids having 14 to 20 carbon atoms, preferably 18 carbon atoms. Mixtures of the various dimers, trimers and tetramers may be present, as well as mixtures of acids of varying numbers of carbon atoms. Of course, the particular vehicle employed may be a mixture of two or more of the above. In fact, commercially available dimer and trimer acids of $C_{18}$ unsaturated fatty acids are available as mixtures; exemplary are the materials sold by Emery Industries, Inc. (Cinncinnati, Ohio) as Empol Trimer and Dimer acids. These mixtures of acid polymers may also be prepared by thermal polymerization of the respective unsaturated fatty acids, such as palmitoleic, oleic, ricinoleic, petroselinic, vaccenic, linoleic, linolenic, eleostearic, licanic, parinaric, gadoleic and arachidonic. Such acids have one or more unsaturated carbon-carbon bonds.

The structure of the acid polymers have not been definitively established, but have been described in the literature as involving an indeterminate linkage X resulting from the polymerization of unsaturated fatty acids; e.g., for trimer acids,

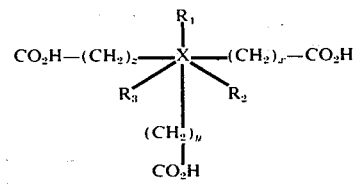

and for dimer acids

Optional in the vehicles is a wax or waxy material to control viscosity and enhance screen-printability. The amount and type of wax employed is dependent, as known to one skilled in the art, upon the desired printing characteristics, the acid and solder employed, the relative amounts of solder and acid, etc. Generally, a wax for this purpose melts above 30°C., preferably above 50°C. Preferred waxes are high molecular weight alcohols having 14 to 18 carbon atoms, preferably straight chain primary alcohols such as tetradecanol-1 hexadecanol-1, and octadecanol-1. Also preferred are paraffin waxes. In addition to the waxes any volatile organic solvent may be employed as a thinner, such as terpineol, methanol, etc.

The solder compositions of the present invention may also include a flux such as tartaric acid, adipic acid, oxalic acid, propylamine hydrochloride, benzamidine hydrochloride, etc. Wetting agents, such as soya lecithin and thixotropic additives such as Baker Castor Oil Co. Thixatrol ST hydrogenated castor oil, may also be present.

Although proportions of components of the solder compositions are selected based upon desired properties at the temperatures to be employed, normally there are 75–95 parts of solder powder and 5–25 parts of vehicle, preferably 80–92 parts solder and 8–20 parts vehicle; the optimum amount of solder is about 90% for some applications. The vehicle may be all polymer of unsaturated fatty acid, or contain up to 50% wax (preferably 10–30% wax) in total acid polymer plus wax. The presence and amounts of thinner, thickener, dispersant, flux, etc., are selected by conventional principles. The relative proportions of the various components are selected dependent upon the densities of the various materials present, and particularly upon the density of the solder powder.

Printing of the solder on metal patterns is by conventional techniques (using screens and stencils). A satisfactory paste should print through an 80-mesh (or finer) screen, but should not drip between printing operations, nor should it dry or stiffen excessively when held on the screen for a reasonable period of time. For satisfactory performance, the vehicle properties and the paste composition should be adjusted to prevent excessive settling out of the solder powder, but not interfere with the printing operation.

Other conventional screen printing constituents, viscosity modifiers, etc., may also be present in the printable solder compositions of this invention. Common rheology modifiers may be included provided they do not adversely affect the properties of the compositions.

The liquid vehicle is prepared by simply admixing the components and/or dissolving one component in another. Any well known techniques of preparing a liquid system may be utilized.

The screen printable solder compositions contain finely divided solder metals dispersed in the liquid vehicle. The solder metals can be any of the conventional single or multiphase metals normally used for soldering, including gold, silver, tin, germanium, silicon, antimony, bismuth, lead, indium, gallium, zinc, copper, phosphorous, alloys thereof and mixtures thereof. The solder metal particles are normally smaller than 100 mesh, and preferably smaller than 200 mesh.

The screen printable solder composition may be applied to any suitable substrate, particularly metal substrates, to form a solder pad. Thereafter, the solder is heated to a temperature where the solder becomes molten and a highly adherent solder bond is formed. Any atmosphere may be used, e.g., air or inert or reducing atmospheres (non-oxidizing).

The invention is illustrated by the following examples. In the examples and elsewhere in the specification, all parts, percentages and proportions of material or components are by weight.

In the examples the solder metal employed was sufficiently finely divided to pass through a 325-mesh screen. The solder paste was printed on a prefired (sintered) thick-film conductor on a ceramic substrate; in Examples 1–9 and Showings A, B, and C, the conductor was Pd/Ag (2/1, by weight); in Example 10 the conductor was Pd/Ag (2.5/1, by weight) and in Example 11 the conductor was Pt/Pd/Au (4/1/15, by weight). All Examples and Showings were heated in air.

EXAMPLES 1-6

Metal solder particles of 10/90 Sn/Pb were dispersed in the vehicle (90 parts solder to 10 parts vehicle), indicated in the Table; then the resultant paste was printed using an 80-mesh screen on a metal pattern and heated as indicated in the Table. Each was observed to reflow well under the conditions stated, erasing screen lines. Screen-printability was observed to be better in Examples 1, 2, 4, 5, and 6 than in Example 3, wherein there was no wax additive. In Example 1, more than 90% of the solder adhered to the Pd/Ag metallization.

TABLE

| Ex. No. | Vehicle (wt. %) | Conditions |
|---|---|---|
| 1 | 80 Empol 1040 $C_{18}$ Trimer Acid<br>20 hexadecanol-1 | 330°C., held 15–30 sec. |
| 2 | Same as Example 1 | preheated at 200–225°C. for several minutes, then 330°C. for 15–30 sec. |
| 3 | 100 Empol 1040 | Same as Ex. 1 |
| 4 | 85 Empol 1040<br>15 octadecanol-1 | Same as Ex. 1 |
| 5 | 90 Empol 1040<br>10 octadecanol-1 | Same as Ex. 1 |
| 6 | 75 Empol 1040<br>25 mixture of equal parts of octadecanol-1, hexadecanol-1, and tetradecanol-1 | Same as Ex. 1 |

EXAMPLE 7

Results similar to those of Example 1 were obtained using a different ratio of solder to vehicle and a dimeric acid:

```
86% 10/90 Sn/Pb solder
13% vehicle of:
    80% Empol 1041 C_{18} dimer acid
    20% octadecanol-1
1% thinner (terpineol)
```

The coated substrate was then heated at 330°–350°C. for 15 sec.-1 minute in air, with excellent results.

EXAMPLE 8

A different solder was employed with similar results:

```
90% 97.5/1.5/1.0 Pb/Ag/Sn
8% vehicle of:
    78% Empol 1040 trimer acid
    22% hexadecanol-1
2% thinner (terpineol)
```

The coated substrate was then heated at 305°C. for 30 seconds, with excellent results.

EXAMPLE 9

In this example a flux was used (adipic acid), but no wax additive. A vehicle was prepared by heating at 60°C. 90 parts Empol 1040 trimer acid and 10 parts adipic acid. The homogeneous vehicle (12 parts) was mixed with 88 parts of 10/90 Sn/Pb solder; printed on a substrate, and heated to 330°C., with excellent results.

EXAMPLE 10

A dimeric acid was used here: 85 parts of 10 Sn/90 Pb solder powder were dispersed in 13 parts of vehicle (85% Empol 1041 dimer acid and 15% octadecanol-1) and 2 parts thinner (terpineol). The vehicle had been prepared by heating the constituents to 60°C. The printed substrate (Pt/Pd/Au) was heated at 330°C. for 30 seconds, with excellent solder reflow and wetting.

EXAMPLE 11

Example 10 was repeated using a Pd/Ag conductor (2.5/1), with the same excellent results.

Showings A, B, and C

The effectiveness of the dimers, trimers, and tetramers of fatty acids, of this invention, is illustrated by the following Comparative Showings wherein other organic acids were ineffective. The solder was 10/90 Sn/Pb, 20 parts solder were dispersed in 80 parts vehicle. The vehicle was 42% terpineol, 35% rosin, 3% Thixatrol ST hydrogenated castor oil and 20% of a flux of oxalic acid (A), lineoleic acid (B) and tartaric acid (C). Upon heating of the printed substrate at 330°C. for 20–60 seconds, little or no consolidation of the solder had occurred, that is, little or no solder reflow was observed.

I claim:

1. In a printable solder paste composition of finely divided metal solder particles dispersed in a liquid vehicle, an improved liquid vehicle of (a) dimers, trimers, and tetramers of unsaturated fatty acids, said unsaturated fatty acids having 14–20 carbon atoms and (b) 10–30% wax by weight of said vehicle.

2. A solder paste according to claim 1 wherein the wax is an aliphatic alcohol having 14–18 carbon atoms.

3. A solder paste according to claim 2 wherein the alcohol is a straight-chain aliphatic alcohol having 14–18 carbon atoms.

4. A solder paste according to claim 1 wherein the wax is a paraffin melting above 50°C.

5. A solder paste according to claim 1 additionally comprising a dispersant.

6. A solder paste according to claim 1 wherein said unsaturated fatty acid has 18 carbon atoms.

7. A solder paste according to claim 2 wherein said unsaturated fatty acid has 18 carbon atoms.

8. A solder paste according to claim 4 wherein said unsaturated fatty acid has 18 carbon atoms.

9. A solder paste according to claim 6 comprising a mixture of dimers and trimers of said fatty acid.

10. A solder paste according to claim 7 comprising a mixture of dimers and trimers of said fatty acid.

11. A solder paste according to claim 8 comprising a mixture of dimers and trimers of said fatty acid.

12. A solder paste according to claim 1 comprising 5–25 parts vehicle and 75–95 parts solder particles.

13. A solder paste according to claim 3 comprising 5–25 parts vehicle and 75–95 parts solder particles.

* * * * *